(12) United States Patent
Pearson et al.

(10) Patent No.: US 9,984,015 B2
(45) Date of Patent: May 29, 2018

(54) COMPUTING SYSTEM CONTROL (71) Applicant: Hewlett-Packard Development Company, L.P., Houston, TX (US)

(72) Inventors: Roger A. Pearson, Fort Collins, CO (US); Raphael Gay, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 15/116,208

(22) PCT Filed: Feb. 28, 2014

(86) PCT No.: PCT/US2014/019560
§ 371 (c)(1),
(2) Date: Aug. 2, 2016

(87) PCT Pub. No.: WO2015/130312
PCT Pub. Date: Sep. 3, 2015

(65) Prior Publication Data
US 2017/0010993 A1    Jan. 12, 2017

(51) Int. Cl.
*G06F 13/362* (2006.01)
*G06F 13/16* (2006.01)
(Continued)

(52) U.S. Cl.
CPC ........ *G06F 13/362* (2013.01); *G06F 13/1678* (2013.01); *G06F 13/4027* (2013.01); *G06F 13/4282* (2013.01)

(58) Field of Classification Search
None
See application file for complete search history.

(56) References Cited

U.S. PATENT DOCUMENTS 5,684,435 A * 11/1997 Bergen ................. G06F 7/4818
329/341
6,487,621 B1    11/2002 MacLaren
(Continued)

FOREIGN PATENT DOCUMENTS

JP         S55116126        9/1980
WO        WO-2014006588    1/2014

OTHER PUBLICATIONS

Chapter 1: Cisco 7200 Series Port Adapter Installation Requirements, Jan. 3, 2008, pp. 1-26, Cisco Technology, Inc.
(Continued)

*Primary Examiner* — Elias Mamo
(74) *Attorney, Agent, or Firm* — HP Inc. Patent Department (57) ABSTRACT

In one example in accordance with the present disclosure, a computing system is provided. The computing system includes a first bus controller to control X bus lanes, a second bus controller to control Y bus lanes, a 2-to-1 X lane multiplexer, and a Y lane system component, where Y>X>0. X lanes from the first bus controller are coupled to the 2-to-1 X lane multiplexer. X lanes from the second bus controller are coupled to the 2-to-1 X lane multiplexer, and Y-X lanes from the second bus controller are coupled directly to the Y lane system component. In addition, X lanes from the 2-to-1 X lane multiplexer are coupled to the Y lane system component.

15 Claims, 5 Drawing Sheets

(51) Int. Cl.
    *G06F 13/40* (2006.01)
    *G06F 13/42* (2006.01)

(56)                References Cited

U.S. PATENT DOCUMENTS 6,633,946 B1     10/2003  Hendel
    6,711,639 B1      3/2004  Singer et al.
    6,799,234 B1      9/2004  Moon et al.
    7,174,413 B2      2/2007  Petrey et al.
    7,657,688 B2 *    2/2010  Atherton ............ G06F 13/4022
                                                            710/307
    8,271,715 B2      9/2012  Yap et al.
    2002/0126660 A1   9/2002  Watanabe et al.
    2012/0144230 A1*  6/2012  Buckland ............ G06F 13/4022
                                                              714/4.5
    2012/0278653 A1* 11/2012  Cheng ................ G06F 11/1417
                                                              714/13
    2012/0311215 A1* 12/2012  Cong .................... G06F 13/382
                                                              710/301
    2014/0223064 A1*  8/2014  Wang .................. G06F 13/4068
                                                              710/301

OTHER PUBLICATIONS

The BPX8093 PCI Express Backplane, 2013, pp. 1-2, Trenton Systems.

\* cited by examiner

COMPUTING SYSTEM CONTROL

CROSS-REFERENCE TO RELATED APPLICATION

This application is a U.S. National Stage Application of and claims priority to International Patent Application No. PCT/US2014/019560, filed on Feb. 28, 2014, and entitled "COMPUTING SYSTEM CONTROL," which is hereby incorporated by reference in its entirety.

BACKGROUND

Today's computing world is facing an ever-growing amount of data to be processed. Some estimates predict that overall data will grow by 50 times by 2020. This data is oftentimes the result of high definition graphics, complex applications, embedded sensors, media files, communication traffic, and the like.

Additionally, today's computing world is facing a user with an increased expectation with regard to latency. In particular, users are becoming less and less patient, and expect computing systems to provide results in a nearby instantaneous manner.

To address these demands, some computer architecture designers are outfitting high-end computing systems like workstations and servers with more than one processor. In many cases, these additional processors are optional so the user can customize their computing system based on their specific preferences, workload, and budget.

BRIEF DESCRIPTION OF THE DRAWINGS

Examples are described in the following detailed description and in reference to the drawings, in which.

NOTATION AND NOMENCLATURE

Certain terms are used throughout the following description and claims to refer to particular system components. As one skilled in the art will appreciate, technology companies may refer to components by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection.

Additionally, the term "bus controller" is intended to mean a device that manages communication on a bus. For example, the device may be a root complex device, and therefore connect a processor and memory subsystem to an I/O slot and generate transaction requests on behalf of the processor, which is interconnected through a local bus. Moreover, the term "multiplexer" is intended to mean a device that selects one of several analog/digital input/output signals/lanes and connects the selected signal/lane to a single input/output signal/lane. In addition, the term "lane" is intended to mean a stream for transporting data. For example, the lane may comprise two differential signaling pairs, where each pair is used as a half-duplex byte stream, transporting data packets in one direction (i.e., the lane is full-duplex and each differential pair is half-duplex). Furthermore, the term "slot" is intended to mean a bus or expansion slot that allows additional boards (e.g., a video card) to be connected to a motherboard or riser board. The slot may be, for example, a Peripheral Component Interconnect (PCI) slot, Peripheral Component Interconnect Express (PCIe) slot, M.2 slot, SFF-8639 port, or Accelerated Graphics Port (AGP) slot.

DETAILED DESCRIPTION

As mentioned above, some high-end computing systems like workstations and servers now have the option to incorporate more than one processor on the motherboard. Given today's multi-core architectures, this provides the ability to have numerous processing cores working in parallel. For example, two 12-core processors in a workstation can place 24 cores at the user's disposal to rapidly conduct complex tasks and provide significant computing power.

Although there are significant benefits to the multi-processor architecture, an issue has arisen due to the optional nature of the additional processor(s). In particular, computing systems such as workstations, servers, and desktops often include input/output (I/O) or expansion slots that allow users to plug-in a variety of cards (e.g., graphics and memory cards) to configure the system to meet their needs. The slots are often industry standard interfaces, such as PCI, PCIe, InfiniBand, RapidIO, HyperTransport, QuickPath Interconnect (QPI), or StarFabric. Moreover, the slots generally interact with a bus controller (e.g., a root complex device in the case of PCIe) that controls the lanes between the bus controller and slot. This bus controller, however, may be located within the processor, and this processor may be optional in some architectures, as mentioned above. As a result, when the optional processor is not installed, the slot which would otherwise nave been interacting with the controller within the processor is rendered non-functional. The same is true when the controller is not located within the optional processor, but is rather located within another optional component (e.g., within the chipset) or as an optional stand-alone component.

As discussed in greater detail below with reference to various examples and figures, aspects of the present disclosure address at least the above-mentioned issue by providing an approach to make the slot (or other system component) functional even when the corresponding and optional processor/controller is not installed. Hence, a slot or other system component that would have been rendered non-functional due to the absence of the optional processor/controller can be utilized and therefore increase the expandability and utilization of the system.

In one example in accordance with an aspect of the present disclosure, a computing system is provided. The computing system comprises a first bus controller to control X bus lanes, a second bus controller to control Y bus lanes, a 2-to-1 X lane multiplexer, and a Y lane system component, where Y>X>0. X lanes from the first bus controller are coupled to the 2-to-1 X lane multiplexer. X lanes from the second bus controller are coupled to the 2-to-1 X lane multiplexer, and Y-X lanes from the second bus controller are coupled directly to the Y lane system component. Additionally, X lanes from the 2-to-1 X lane multiplexer are coupled to the Y lane system component. In one implementation, the 2-to-1 X lane multiplexer is to select between the lanes from the first bus controller and the lanes from the second bus controller based on whether the second bus controller is present within the computing system. Additionally, in some implementations, a first processor comprises the first bus controller, and a second processor composes the second bus controller, where the first processor is fixed within the system and the second processor is optional within the system.

In another example in accordance with the present disclosure, another computing system is provided. The computing system composes a first bus controller to control X bus lanes, a second bus controller to control Y bus lanes (where Y>X>0), a 2-to-1 X lane multiplexer, a Y lane I/O slot, and system firmware (e.g., BIOS/UEFI) to control operation of at least one of the 2-to-1 X lane multiplexer, the first bus controller, and the second bus controller. X lanes from the first bus controller are coupled to the 2-to-1 X lane multiplexer. X lanes from the second bus controller are coupled to the 2-to-1 X lane multiplexer, and Y-X lanes from the second bus controller are coupled directly to the Y lane slot X lanes from the 2-to-1 X lane multiplexer are coupled to the Y lane slot. In one implementation, the system firmware is to control the 2-to-1 X lane multiplexer to select the lanes received from the first bus controller, and further control the second bus controller to disable the Y-X lanes from the second bus controller that are coupled directly to the Y lane slot. In another implementation, the system firmware is to control the 2-to-1 X lane multiplexer to select the X lanes received from the second bus controller.

In yet another example in accordance with the present disclosure, another computing system is provided. The computing system comprises a mandatory bus controller, an optional bus controller, a 2-to-1 multiplexer, and a system component. The 2-to-1 multiplexer is coupled to the mandatory bus controller, and the 2-to-1 multiplexer is also coupled to the optional bus controller. The system component is coupled to the 2-to-1 multiplexer and the system component is also coupled directly to the optional bus controller. Operations of the 2-to-1 multiplexer and the optional bus controller are controllable via a system firmware to enable the system component to interact with bus lanes from either the mandatory bus controller or the optional bus controller.

Figure 1:
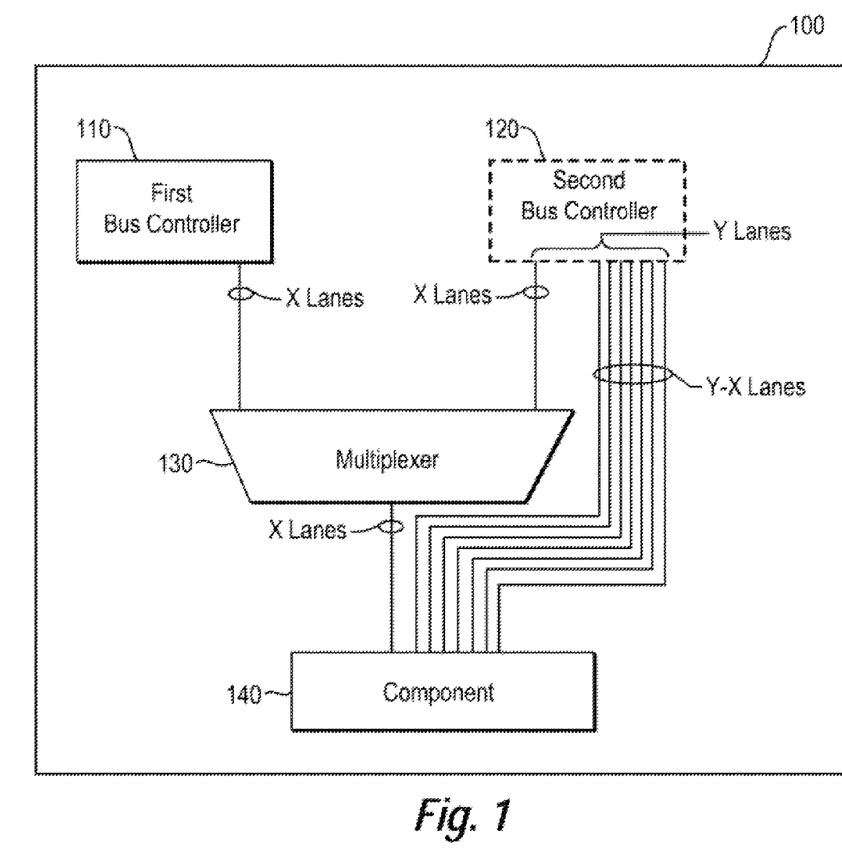
FIG. 1 depicts an example computing system in accordance with an aspect of the present disclosure.

Turning to FIG. 1, this figure depicts an example computing system 100 in accordance with an aspect of the present disclosure. More specifically, FIG. 1 depicts a computing system architecture wherein the system component 140 remains functional and interacts with bus lanes from either the first bus controller 110 or the second bus controller 120 depending on whether the second bus controller 120 is installed. That is, the system component 140 is not rendered non-functional due to the second bus controller 120 not being installed in the computing system 100.

The computing system 100 may be, for example, a desktop, workstation, laptop, scientific instrument, gaming device, tablet, AiO desktop, television, detachable tablet/laptop, server, retail point of sale device, smartphone, or other similar computing system. The computing system 100 comprises a first bus controller 110, a second bus controller 120, a multiplexer 130, and a system component 140 (each described in greater detail below). It should be readily apparent that the system 100 is a generalized illustration and that other elements may be added or existing elements may be removed, modified, or rearranged without departing from the scope of the present disclosure. For example, the computing system 100 may include other components common to a computing system such as, for example, a network interface, a fan, an optical drive, a memory device, a power supply, a motherboard, or the like.

Looking now at the first bus controller 110 and the second bus controller 120. These components manage communication with at least the system component 140. For example, when the system component 140 comprises a PCIe I/O slot, the first bus controller 110 and the second bus controller 120 act as root complex devices. The first bus controller 110 and the second bus controller 120, therefore, may connect the processor and memory subsystem (not shown) to the PCIe I/O slot 140, and generate transaction requests on behalf of the processor, which is interconnected through a local bus.

Depending on the implementation, the first bus controller 110 and/or second bus controller 120 may be discrete devices, or may be integrated within a processor, chipset, and/or other component (not shown). In some examples, the second bus controller 120 is an optional component within the computing system 100 (and therefore shown in dotted lines in FIG. 1) and the first bus controller 110 is a fixed component within the computing system 100 (and therefore shown in solid lines in FIG. 1). This may be because the second bus controller 120 is integrated within an optional processor or other optional component (e.g., a chipset) of the computing system 100. This may also be because the second bus controller 120 is a discrete component that is optional within the computing system 100.

In various examples, the second bus controller 120 controls more bus lanes than the first bus controller 110. For example, in one implementation, the second bus controller 120 controls Y lanes and the first bus controller 110 controls X bus lanes, where Y>X>0. More specifically, in one implementation, the second bus controller 120 controls 8 bus lanes and the first bus controller controls 1 bus lane. In another implementation, the second bus controller 120 controls 4 bus lanes and the first bus controller 110 controls 1 bus lane. Furthermore, m another implementation, the second bus controller 120 controls 8 bus lanes and the first bus controller 110 controls 2 bus lanes.

Turning now to the multiplexer 130, this component selects one of several analog/digital input/output signals or lanes and connects the input/output signal/lane to a single input/output signal/lane. For example, the multiplexer 130 can select one of two lanes received from the first bus controller 110 and second bus controller 120 and couple the selected lane to the system component 140. In some examples, operation of the multiplexer 130 is controlled by internal logic. In other examples, operation of the multiplexer 130 is controlled by a basic input/output system (BIOS) or a unified extensible firmware interface (UEFI) of the computing system 100. In yet further examples, the multiplexer 130 includes logic to sense whether the second bus controller 120 is present, and conducts operations based at least in part on this sensed condition.

Looking now at the system component 140, this component may be an I/O or expansion slot in various examples. For example, the component may be a PCIe slot, accelerated graphic port (AGP) slot, PCI slot, M.2 slot SFF-8639 port, or other similar expansion slots. In other examples, the system component 140 may be another component on the motherboard such as a storage controller, network controller, graphics controller, etc.

Now looking at the whole system 100 shown in FIG. 1, as mentioned above, this architecture enables the system component 140 to remain functional and interact with lanes from either the first bus controller 110 or the second bus controller 120, depending on whether the second bus controller 120 is installed. As deputed in FIG. 1, the first bus controller 110 is to control X bus lanes (e.g., 1 bus lane), and the second bus controller 120 is to control Y bus lanes (e.g., 8 bus lanes), where Y>X>0. The X lanes (e.g., 1 lane) from the first bus controller 110 are coupled to the 2-to-1 X lane multiplexer 130. In addition, X lanes (e.g., 1 lane) from the second bus controller 120 are coupled to the 2-to-1 X lane multiplexer 130, and Y-X lanes (e.g., 7 lanes) from the second bus controller are coupled directly to the Y lane system component (e.g., a PCIe slot).

Given the above-mentioned configuration, when the second bus controller 120 is present, the multiplexer 130 senses the second bus controller 120 is present and selects the X lanes from the second bus controller 120, and this selection in combination with the Y-X lanes directly coupled between the second bus controller 120 and the system component 140, enables the second bus controller 120 to interact with the system component 140. In the case when the system component 140 is a Y lane slot (e.g., a Y lane PCIe slot), the configuration enables the second bus controller 120 to control each of the Y lanes on the Y lane slot.

By contrast, when the second bus controller 120 is not present, the multiplexer 130 senses the second bus controller 120 is not present and selects the X lanes from the first bus controller 110, and this selection enables the first bus controller 110 to interact with the system component 140 and control the lanes therebetween. In the case when the system component 140 is a Y lane slot (e.g., a Y lane PCIe slot), the configuration enables the first bus controller 110 to control X lanes on the Y lane slot, and still be rendered functional per, e.g., the PCIe specification which allows for example a x8 slot to operate as a x1 slot when interacting with a x1 controller.

Figure 2:
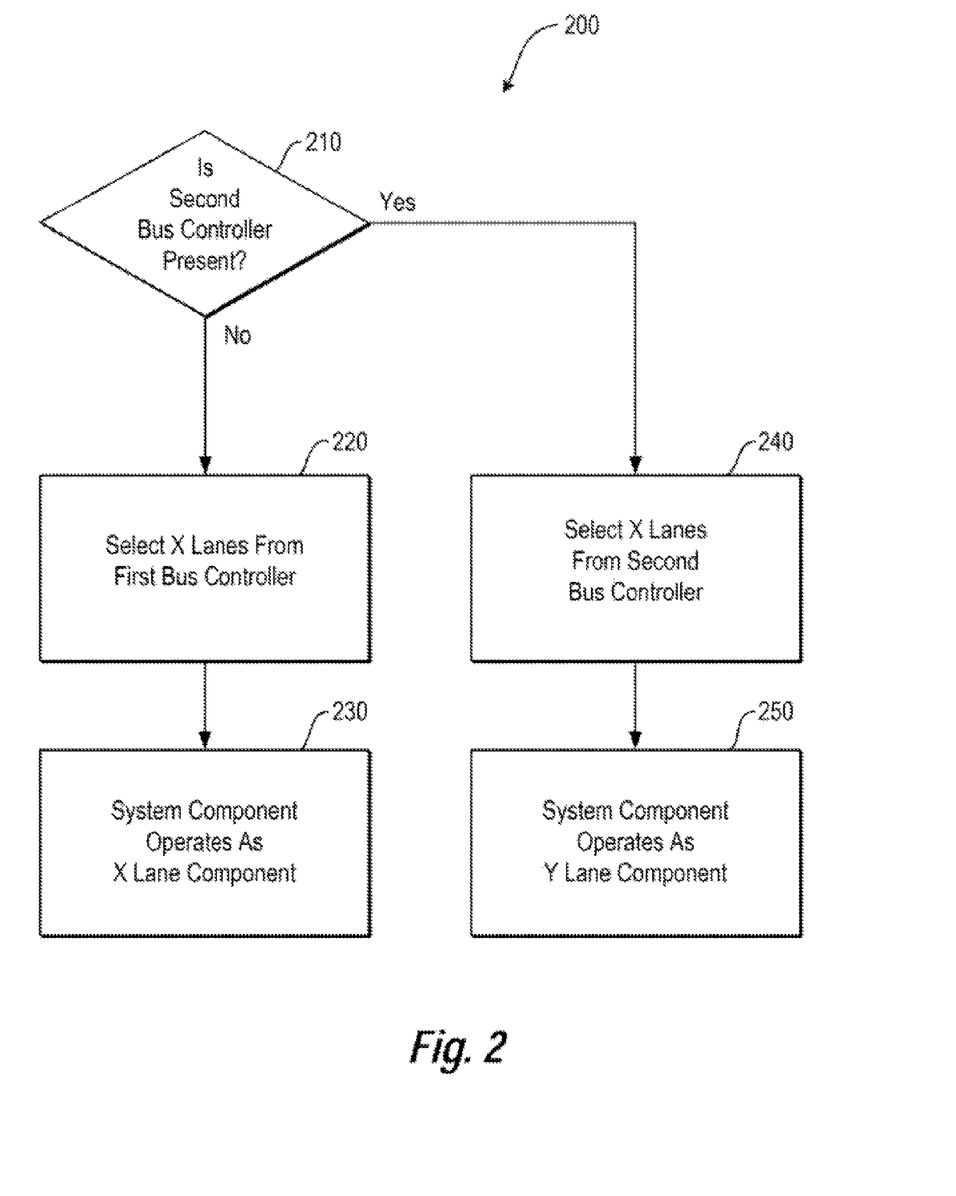
FIG. 2 depicts an example process flow diagram for operation of the computing system depicted in FIG. 1 in accordance with an aspect of the present disclosure.

Turning now to FIG. 2, this figure depicts a process flow diagram 200 for the computing system 100 depicted in FIG. 1 in accordance with an aspect of the present disclosure. It should be readily apparent that the processes depicted in FIG. 2 represent generalized illustrations, and that other processes may be added or existing processes may be removed, modified, or rearranged without departing from the scope and spirit of the present disclosure. Additionally, it should be understood that the processes may represent functions and/or actions performed by circuits or logic associated with at least one system component (e.g., a multiplexer, slot, and/or controller). Furthermore, FIG. 2 is not intended to limit the implementation of the described processes, but rather the figure illustrates functional information one skilled in the art could use to design/fabricate circuits, generate machine-readable instructions (e.g., software, firmware, etc.), or use a combination of hardware and software to perform the illustrated processes.

The process 200 may begin at block 210, where a determination is made as to whether the second bus controller 120 is present. In an example, this determination is made by the multiplexer 130 via logic and/or a sensing functionality. At block 220, in response to determining that the second bus controller 120 is not present, the multiplexer 130 selects the X lanes from the first bus controller 110. Thereafter, at block 230, the system component 140 (e.g., a PCIe slot) operates as an X lane system component (e.g., operates as a x1 PCIe slot when X=1 and the system component is a PCIe slot).

By contrast, at block 240, in response to determining that the second bus controller 120 is present, the multiplexer 130 selects the X lanes from the second bus controller 120. Thereafter, at block 250, the system component 140 (e.g., a PCIe slot) operates as a Y lane system component (e.g., operates as a x8 PCIe slot when X=1 and Y=8) in response to the selection by the multiplexer 130 and the directly coupled lanes from the second bus controller 120. Accordingly, the system component 140 operates as a Y lane component interacting with the second bus controller 120 when the second bus controller 120 is present, and as an X lane system component interacting with the first bus controller 110 when the second bus controller 120 is not present. Hence, among other things, the above-discussed issue of a system component rendered non-functional due to the absence of a respective controller is resolved.

Figure 3A:
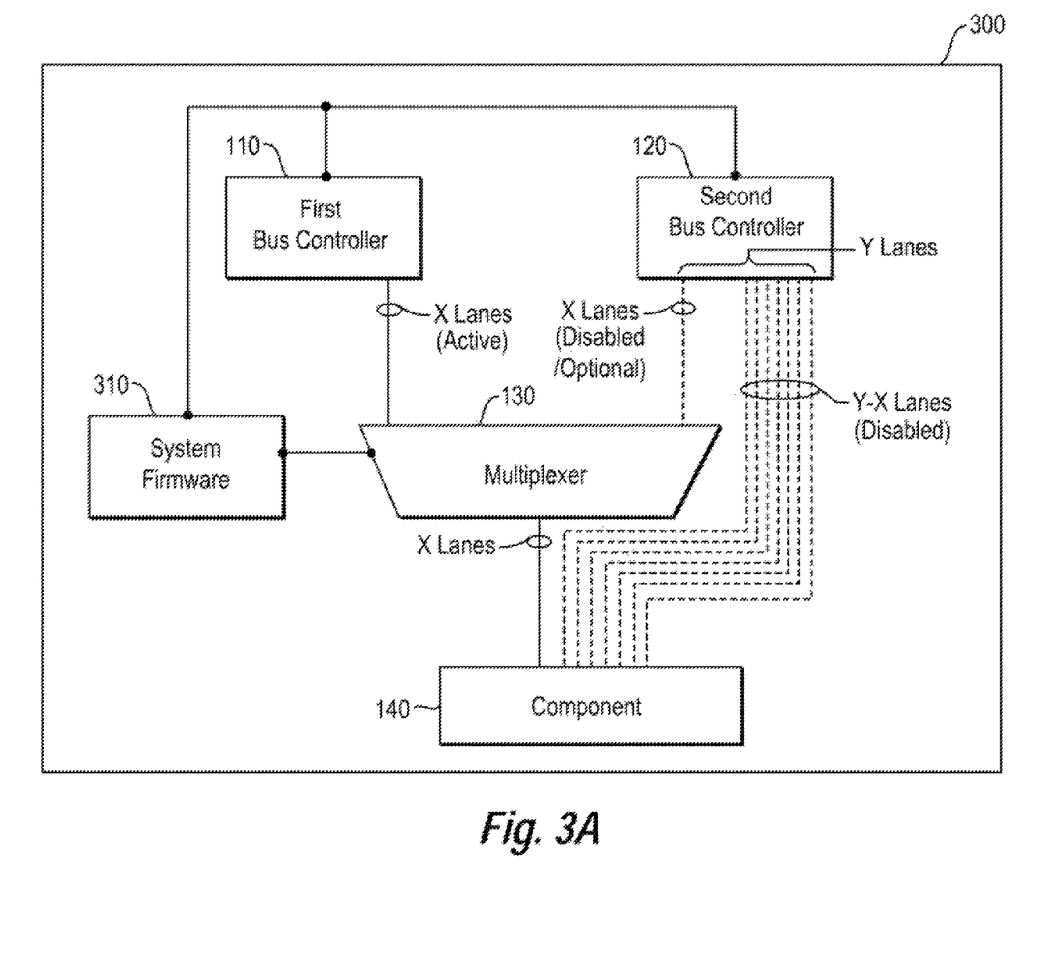
FIGS. 3A and 3B depict another example computing system in accordance with an aspect of the present disclosure where system firmware is utilized to control aspects of the multiplexer, first bus controller, and/or second bus controller.
Figure 3B:
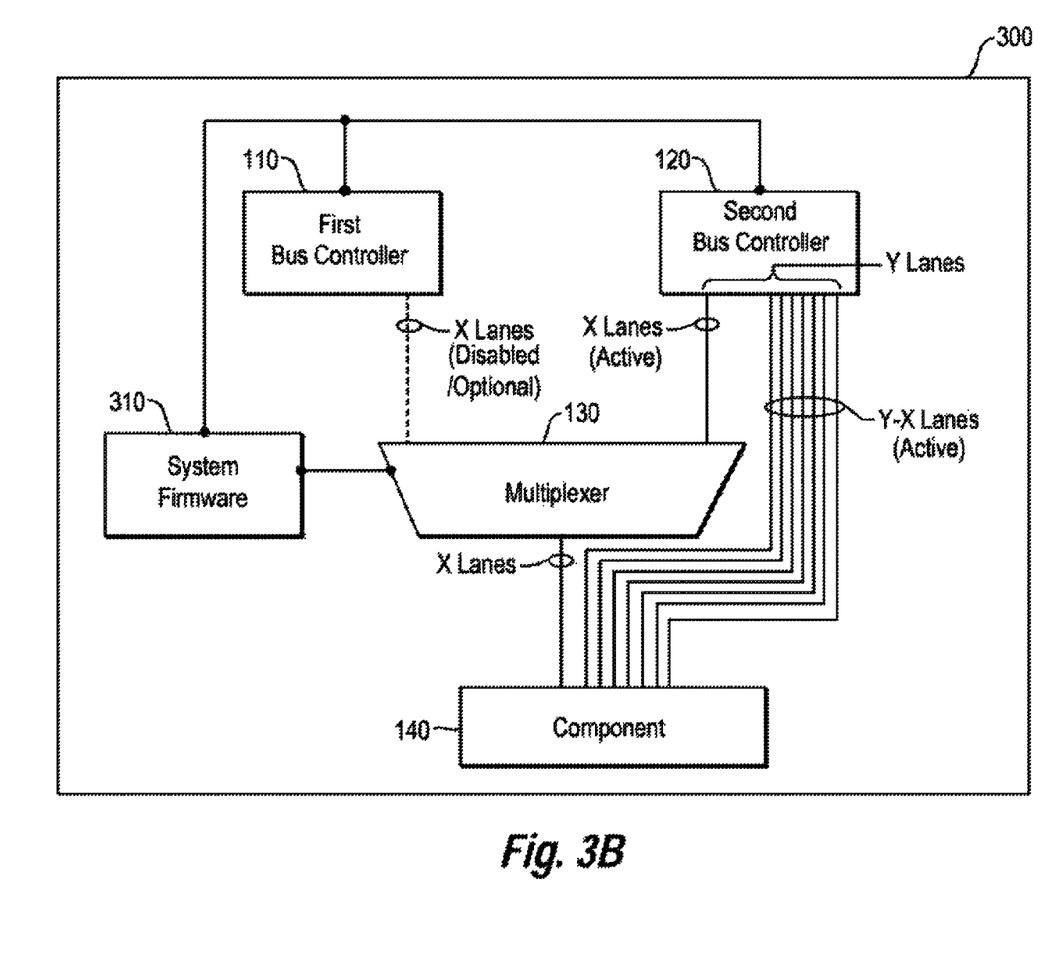

Moving on to FIGS. 3A and 3B, these figures depict another example computing system 300 in accordance with a different aspect of the present disclosure. In particular, the architecture shown in FIGS. 3A and 3B are similar to FIG. 1, but system firmware 310 is coupled to and controls aspects of the multiplexer 130, first bus controller 110 and/or second bus controller 120. The system firmware 310 may comprise, for example, a basic input/output system (BIOS) or a unified extensible firmware interface (UEFI). The system firmware 310 controls the multiplexer 130 to select lanes from the first bus controller 110 or second bus controller 120 based on user preference and not based solely on whether the second bus controller is sensed 120. That is, even if the second bus controller 120 is present, the multiplexer 130 may still select the lanes from the first bus controller 110 and therefore the first bus controller 110 would interact with the system component 140 as opposed to the second bus controller 120. This may be useful in situations such as for example, when the first bus controller 110 is a GEN3 X lane component and the second bus controller 120 is a GEN2 Y lane component, where Y>X>0. In this situation, the second bus controller 120 may control more lanes but the first bus controller 110 may have faster lanes.

Thus, and referring to FIG. 3A, if a user prefers to utilize the fewer faster lanes of the first bus controller 110, the user may utilize system firmware 310 to control the multiplexer 130 to select the X lanes from the first bus controller 110. In addition, the system firmware 310 may control the second bus controller 120 to disable at least the Y-X lanes directly coupled to the system component 140. It should be noted that disabling the X lanes of the second bus controller 120 would be optional because the multiplexer 130 would not be selecting these lanes in this scenario.

By contrast, and referring to FIG. 3B, if a user prefers to utilize the more numerous but slower lanes of the second bus controller 120, the user may utilize system firmware 310 to control the multiplexer 130 to select the X lanes from the second bus controller 120. In addition, the system firmware 310 may control the first bus controller 120 to disable the X lanes from the first bus controller 120. It should be noted that disabling the X lanes of the first bus controller 110 would be optional because the multiplexer 130 would not be selecting these lanes in this scenario.

Figure 4:
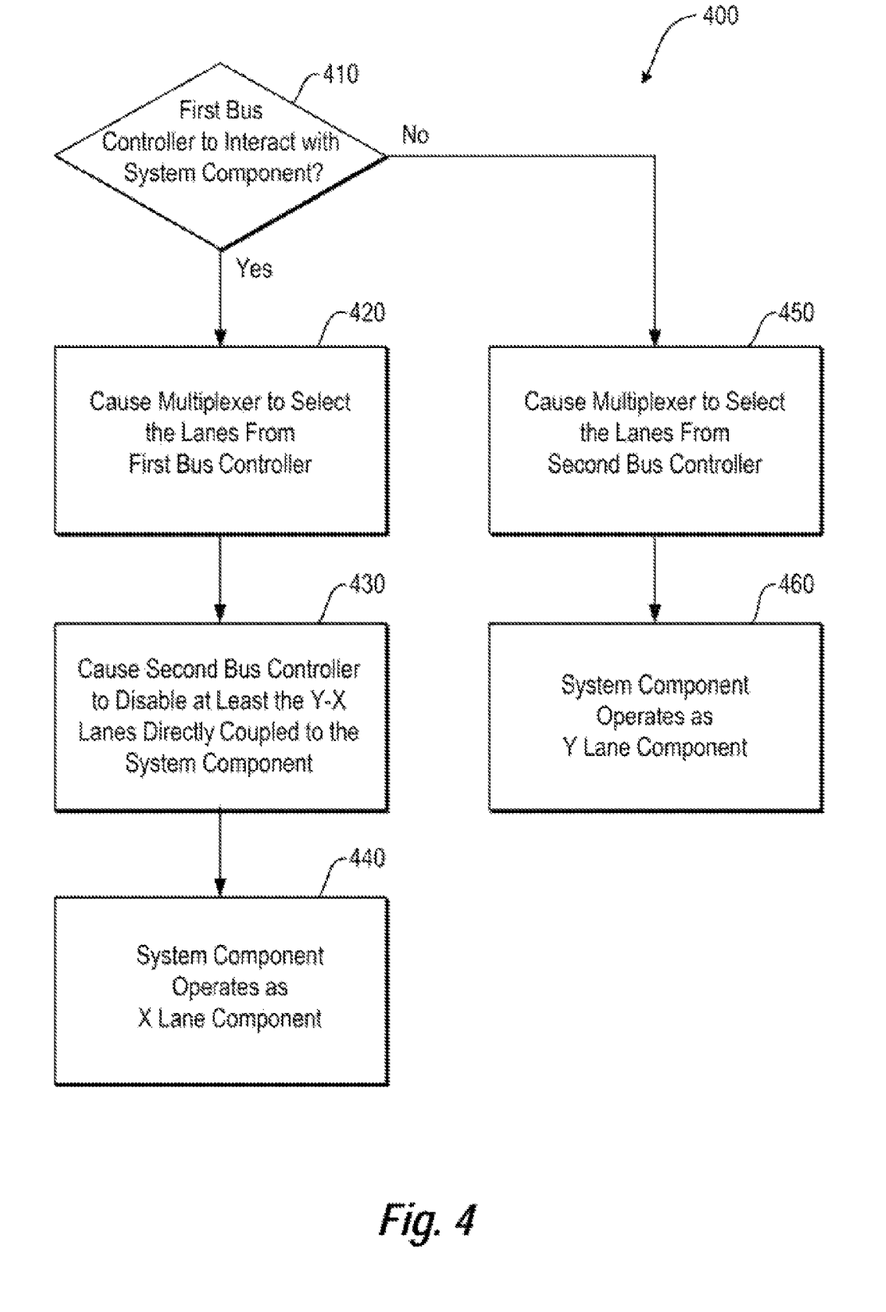
FIG. 4 depicts another example process flow diagram for operation of the computing system depicted in FIGS. 3A and 3B in accordance with an aspect of the present disclosure.

Turning now to FIG. 4, this figure depicts a process flow diagram 400 for the computing system 300 depicted in FIGS. 3A and 3B in accordance with an aspect of the present disclosure. It should be readily apparent that the processes depicted in FIG. 4 represent generalized illustrations, and that other processes may be added or existing processes may be removed, modified, or rearranged without departing from the scope and spirit of the present disclosure. Further, it should be understood that the processes may represent executable instructions stored on a memory (e.g., a flash memory device) that may cause a component like the multiplexer 130, first bus controller 110, and/or second bus controller 120 to respond, to perform actions, to change states, and/or to make decisions. Thus, the described processes may be implemented as executable instructions and/or operations provided by a memory associated with a computing system 300. Alternatively or in addition, the processes may represent functions and/or actions performed by circuits or logic associated with at least one system component (e.g., a multiplexer, slot, and/or controller). Furthermore, FIG. 4 is not intended to limit the implementation of the described processes, but rather the figure illustrates functional information one skilled in the art could use to design/fabricate circuits, generate machine-readable instructions (e.g., software, firmware, etc.), or use a combination of hardware and software to perform the illustrated processes.

The process 400 may begin at block 410, where a decision is made as to whether the first bus controller 110 is to interact or otherwise couple the bus/lanes with the system component 140. As mentioned above, this may be the case when the first bus controller 110 is a GEN3 X lane component and the second bus controller 120 is a GEN2 Y lane component, where Y>X>0, and hence the second bus controller 120 may control more lanes but the first bus controller 110 may have faster lanes.

If a determination is made that the first bus controller 110 is to interact or otherwise couple the bus/lanes with the system component 140, at block 420, the system firmware 310 is to cause the multiplexer 130 to select the X lanes received from the first bus controller 110. Additionally, at block 430, the system firmware 310 is to cause the second bus controller 120 to disable at least the Y-X lanes directly coupled to the system component 140. As a result, at block 440, the system component 140 operates as an X lane component interacting with the first bus controller 110.

By contrast, if the determination is made that the first bus controller 110 is to not interact or otherwise couple the bus/lanes with the system component 140, at block 450, the system firmware 310 is to cause the multiplexer 130 to select the X lanes from the second bus controller 120. As a result, at block 460, the system component 140 operates as a Y lane component interacting with the second bus controller 120. Hence, the user has the option to select which controller interacts with the system component 140, and therefore potentially take advantage of the fact that a controller may have more/less and/or faster/slower lanes.

The foregoing provides various examples which address at least the issue of a system component being rendered non-functional due to the absence of a corresponding controller. Moreover, the foregoing provides various examples which provide the user with the capability to determine which controller interacts or otherwise couples the bus/lanes with the system component when respective corresponding controllers are present. As one of ordinary skill would understand, the solution does so in a cost effective manner, and specifically enables the multiplexer to only have to support the number of lanes associated with the controller which supports less lanes. For example, if the first bus controller controls 1 lane and the second bus controller controls 8 lanes, a 2-to-1 multiplexer that is 1 lane wide would be appropriate for the architecture described in the present disclosure. Similarly, if the first bus controller controls 2 lanes and the second bus controller controls 8 lanes, a 2-to-1 multiplexer that is 2 lanes wide would be appropriate for the architecture described in the present disclosure. Among other things, this may reduce cost due to use of a narrower, lower-cost multiplexer. In addition, this may reduce the footprint of the multiplexer.

While the above disclosure has been shown and described with reference to the foregoing examples, it should be understood that other forms, details, and implementations may be made without departing from the spirit and scope of the disclosure that is defined in the following claims.

What is claimed is:

1. A computing system comprising:
   a first bus controller to control X bus lanes;
   a second bus controller to control Y bus lanes;
   a 2-to-1 X lane multiplexer, and
   a Y lane system component,
      wherein Y>X>0,
      wherein X lanes from the first bus controller are coupled to the 2-to-1 X lane multiplexer,
      wherein X lanes from the second bus controller are coupled to the 2-to-1 X lane multiplexer, and Y-X lanes from the second bus controller are coupled directly to the Y lane system component, and
      wherein X lanes from the 2-to-1 X lane multiplexer are coupled to the Y lane system component.

2. The computing system of claim 1, wherein a first processor comprises the first bus controller, and a second processor comprises the second bus controller.

3. The computing system of claim 2, wherein the first processor is fixed within the computing system, and the second processor is optional within the computing system.

4. The computing system of claim 1, wherein the 2-to-1 X lane multiplexer is to select between the X lanes from the first bus controller and the X lanes from the second bus controller based on whether the second bus controller is present within the computing system.

5. The computing system of claim 1, wherein the first bus controller is to control X Peripheral Component Interconnect Express (PCIe) lanes, and wherein the second bus controller is to control Y PCIe bus lanes.

6. The computing system of claim 1, wherein the first bus controller is a Peripheral Component Interconnect Express (PCIe) root complex device, and wherein the second bus controller is a PCIe root complex device.

7. The computing system of claim 1, wherein the Y lane system component comprises a Y lane slot.

8. A computing system comprising:
   a first bus controller to control X bus lanes;
   a second bus controller to control Y bus lanes;
   a 2-to-1 X lane multiplexer;
   a Y lane slot; and
   system firmware to control operation of at least one of the 2-to-1 X lane multiplexer, the first bus controller and the second bus controller,
      wherein Y>X>0,
      wherein X lanes from the first bus controller are coupled to the 2-to-1 X lane multiplexer,
      wherein X lanes from the second bus controller are coupled to the 2-to-1 X lane multiplexer, and Y-X lanes from the second bus controller are coupled directly to the Y lane slot, and
      wherein an X lanes from the 2-to-1 X lane multiplexer are coupled to the Y lane slot.

9. The computing system of claim 8, wherein the system firmware comprises a basic input/output system (BIOS) or a unified extensible firmware interface (UEFI).

10. The computing system of claim 8, wherein the system firmware is to control the 2-to-1 X lane multiplexer to select X lanes from the first bus controller, and further control the second bus controller to disable the Y-X lanes from the second bus controller that are coupled directly to the Y lane slot.

11. The computing system of claim 8, wherein the system firmware is to control the 2-to-1 X lane multiplexer to select the X lanes from the second bus controller.

12. The computing system of claim 8, wherein the first bus controller is to control X Peripheral Component Interconnect Express (PCIe) lanes, and wherein the second bus controller is to control Y PCIe lanes.

13. A computing system comprising:
a mandatory bus controller;
an optional bus controller;
a 2-to-1 multiplexer; and
a system component,
wherein the 2-to-1 multiplexer is coupled to the mandatory bus controller,
wherein the 2-to-1 multiplexer is also coupled to the optional bus controller,
wherein the system component is coupled to the 2-to-1 multiplexer,
wherein the system component is also coupled directly to the optional bus controller, and
wherein operations of the 2-to-1 multiplexer and the optional bus controller are controllable via system firmware to enable the system component to interact with bus lanes from either the mandatory bus controller or the optional bus controller.

14. The system of claim 13, wherein the system component comprises an input/output (I/O) slot.

15. The system of claim 13, wherein the optional bus controller is to control more bus lanes than the mandatory bus controller.

* * * * *